Patented June 16, 1953

2,642,360

UNITED STATES PATENT OFFICE 2,642,360

MANUFACTURE OF WET STRENGTH PAPER

Herbert William Mackinney, East Orange, and Sidney Joseph Schultz, Cranford, N. J., assignors, by mesne assignments, to Union Carbide and Carbon Corporation, a corporation of New York No Drawing. Application December 27, 1946, Serial No. 718,894

5 Claims. (Cl. 92—21)

This invention relates to the production of cellulosic paper treated with heat-hardenable modified urea formaldehyde condensation products for imparting appreciable wet-strength thereto.

Heat-hardenable urea-formaldehyde resins have been previously proposed as a sizing material for cellulosic paper. The disclosures in the literature and patents relating to this art have taught the use of small quantities of urea formaldehyde resin (one half–five percent on the weight of the paper) as being sufficient for imparting a considerable improvement in the wet-strength of the paper without detrimentally affecting the suppleness or foldability of the paper. They have furthermore generally taught the use of acids or acidic substances for accelerating the heat conversion of the fusible urea formaldehyde resin distributed within the paper during the drying step of the wet sheet or web.

In the sizing operation practical economies dictate the use of water as a solvent or a dispersing medium for urea formaldehyde resins as well as other sizing materials, because water is not only cheap and eliminates the fire hazard attendant with most organic solvents but is also the major processing agent customarily used in the manufacture of cellulosic paper. Accordingly it is highly desirable that resinous sizing materials should function satisfactorily in aqueous systems to warrant their use in practical paper manufacture.

A further desideratum for a practical resin size is that it can be used as a beater or engine size. One of the requirements for this sizing method is that the size when added to the paper fibers suspended in water is or can be dispersed or precipitated as fine water-insoluble particles to be adsorbed or retained by the paper fibers prior to formation of the paper sheet. Sizes which are completely water soluble at any dilution can only be used for sizing paper after it has been formed into a sheet or web, because these sizes are washed out and lost if used in beater sizing. Tub sizing of the formed sheet is more expensive, since the paper sheet is then subject to two drying operations.

As late as 1942 it was reported in the literature that no urea formaldehyde resin capable of effective use in the beater had as yet been developed. Since then there have been discovered several methods for modifying the water soluble urea formaldehyde resins enabling them to be used for beater sizing. One method comprises further reacting a water-soluble urea-formaldehyde resin in the presence of soap or similar protective colloid to a stage where it is insoluble in cold water but soluble in hot water (50–90° C.); a solution of such treated resin in hot water when added to a much larger quantity of cold water present in the beater so disperses the resin that it is distributed and suspended in fine particle form whereby it is readily retained by the paper fibers. In another method a urea formaldehyde resin soluble in cold water is added to the beater stock rendered acid (pH 3–4) by the addition of acids and/or acidic salts such as hydrochloric acid and aluminum sulfate; upon standing for several hours under these conditions of acidity and extreme dilution the water-soluble resin reacts to form a colloidal suspension of hydrophobic urea resin particles which ultimately precipitate upon or attach to the paper fibers. In still another method a urea formaldehyde resin, condensed to a stage where it tolerates only a small quantity of water, is dissolved in an equal quantity of a lower monohydric alcohol e. g. ethyl, isopropyl or butyl alcohol; a resin thus treated can be dissolved in hot water (50° C. and higher), and the solution disperses satisfactorily upon dilution with an excess quantity of acidified water.

But with any of the aforementioned procedures satisfactory and uniform dispersions are difficult to prepare. Another difficulty is that of curing the fusible urea formaldehyde resin in the paper sheet to an infusible and insoluble state within approximately the same time period and temperature condition necesary for drying wet paper per se; drying of paper at elevated temperatures must be carefully controlled to avoid undue exposure to heat with its attendant degradation of cellulosic paper. Again proposals hitherto made for accelerating the curing speed of urea formaldehyde resins used in paper sizing have emphasized strongly acidic conditions. A review by Taft, entitled "Use of urea formaldehyde resins for wet strength paper production," Paper Trade Journal, March 6, 1941 (Tappi section, pages 122 to 126), stresses that the desirable pH conditions for rapidly curing water soluble urea formaldehyde resins are in the range between three and four. It is recognized however that the dried sized paper then contains residual amounts of acidic catalyst which tends to degrade or tenderize the paper on storage, and which is also the probable cause for paper sized with conventional urea formaldehyde resins to lose a considerable portion of the original wet strength upon aging.

It would seem that careful further condensation of the urea-formaledhyde resin before applying it to cellulosic paper would reduce the curing time of the resin and/or the amount of acidic catalyst required. But pre-advancement has been found to be of limited value, since dispersibility of the urea formaldehyde resin in water is lost before an appreciable reduction in the curing time is obtained. Furthermore, preadvancement so reduces the adhesive or substantive effect of the resin to the paper fibers, that more resin is required to obtain the same wet-strength value than with non-advanced water-soluble resin applied by tub sizing methods.

It has now been found that by reacting certain polyhydric phenols with the heat-reactive initial water-soluble condensation products of urea and formaldehyde the products are so chemically modified that they exhibit satisfactory dispersibility in aqueous systems concomitantly with excellent substantive or adhesive effects for cellulosic paper fibers. The so modified products heat-cure more rapidly and require less acidic catalyst than unmodified urea formaldehyde resin. Less of the modified product is required to obtain the same wet strength developed by larger amounts of unmodified urea formaldehyde resin; and in contrast papers so sized do not deteriorate with respect to wet tensile strength upon long storage but instead they then tend to have higher values since further curing takes place, even at room temperature. The pre-treatment or modification of water-soluble urea formaldehyde condensation products with certain polyhydric phenols under controlled reacting conditions furthermore unexpectedly yields fusible, heat-convertible hydrophobic resinous products which are exceedingly soluble in aqueous alkaline solutions, including very dilute solutions, but which on the other hand are from partially to completely insoluble in neutral or acidified water.

Another important advantage realized by this discovery is that the polyhydric phenol-modified urea-formaldehyde condensation products, because of their solubility in aqueous alkaline solutions, can be diluted to any desired solids concentration for tub and like methods of sizing cellulosic paper to yield paper of improved wet-strength superior to that treated with unmodified urea formaldehyde resins. Of even greater importance as respects engine or beater sizing is that the aqueous alkaline solutions of polyhydric phenol modified urea formaldehyde condensation products upon admixture and dilution with an excess quantity of acidified water yield colloidal dispersions of the condensation products that precipitate upon paper fibers in considerably less time than unmodified urea formaldehyde resins.

Electrophoresis studies of the modified resin show a positive charge on the dispersed resin particles when alkaline aqueous solutions of the resin are greatly diluted and then carefully acidified whereby a colloidal dispersion is formed. Since cellulosic paper fibers in aqueous suspension exhibit a negative charge, the positively charged colloidal particles of the modified resin are strongly attracted to the paper fibers resulting in a rapid and adherent deposition of the colloidal particles on the paper fibers. Under the same aqueous acidic conditions unmodified water-soluble heat-reactive condensation products of urea and formaldehyde are considerably slower in forming a dispersion, since some time must elapse before the acid acting as a catalyst converts the water-soluble product into an insoluble form; the resultant dispersed particles of unmodified water-soluble urea-formaldehyde resin are apparently electrically neutral or negative since considerable time elapses before a major amount of resin is precipitated upon the paper fiber and a sheet can be formed.

The polyhydric phenols, which have been found useful for the purpose of modifying water-soluble, heat-reactive condensation products of urea and formaldehyde to obtain reaction products soluble in aqueous alkaline solutions, are those phenols having at least two hydroxyl groups in a meta position to each other and for each meta hydroxyl group at least one individual hydrogen atom ortho thereto on the phenolic ring. This definition of operable polyhydric phenols is illustrated by the following specific phenols namely, resorcinol, phloroglucinol, pyrogallol, 1,3-dihydroxynaphthalene, their alkylated derivatives such as orcinol, cresorcinol, 2,6-dihydroxy toluene, 3,5-dihydroxy-o-xylene, $\beta$-orcinol, n-propylresorcinol, mono-methyl phloroglucinol, 1-ethyl-3,4,5-pyrogallol and 1-propyl-3,4,5-pyrogallol. In addition their halogenated derivatives such as tetrachlororesorcinol and trichlororesorcinol have also been found useful under alkaline reacting conditions whereby they lose halogen and apparently form in situ a polyhydric phenol of the class described.

Other polyhydric phenols, not having at least two hydroxyl groups meta to each other and at least one individual hydrogen atom ortho to each of the meta hydroxyl groups when similarly reacted with water-soluble, heat-reactive condensation products of urea and formaldehyde yield hydrophobic resinous products; such resins are characterized by insolubility in aqueous alkaline solutions, or, if soluble at all, the solubility is transitory, lasting at most for only a few minutes after the preparation of the solution. While it has been proposed to react condensation products of urea and formaldehyde with monohydric phenols, such as phenol, cresol, xylenol and the like, for the purpose of increasing the water-resistance of the urea formaldehyde resin when cured, these monohydric phenols, while yielding hydrophobic resinous products, do not confer solubility in aqueous alkaline solutions of any extended duration and therefore they have no utility for the purpose intended.

The condensation products of urea and formaldehyde, which are improved by reaction with a polyhydric phenol for use in paper sizing for improving wet-strength, include all reaction products of urea and formaldehyde that are made from equal molar proportions up to four mols of formaldehyde to one mol of urea, provided they can be isolated in water-soluble form at some stage of their reaction and are heat-reactive per se or in the presence of catalyst for conversion into an infusible and insoluble form. Such reaction products include all the methylol ureas, mono, di, tri, and tetra, singly or in admixture, as well as their further condensation products of a resinous nature soluble in at least an equal quantity of neutral water. The preferred urea formaldehyde condensation products for reaction with the defined polyhydric phenols are derived from the reaction of one mol urea and between 1.5 mols and 3.0 mols of formaldehyde because such products in subsequent reaction with the polyhydric phenol yield the most rapidly heat-hardening resins and have the highest degreen of water resistance. Products made with less than 1.5 mols of formaledhyde per mol of urea tend to be less stable, whereas those made with molar proportions of formaldehyde above 3.0 mols tend to give side reaction products with the polyhydric phenols.

The exact nature of the chemical reaction between water-soluble condensation products of urea and formaldehyde with the polyhydric phenols is presently unknown. Analytical examinations of the final infusible resins show that the polyhydric phenol is a firmly bound component since it cannot be extracted or its presence detected by the usual tests for such substances. A possible explanation, based upon the small amounts of selected polyhydric phenol required for reacting with water-soluble urea formaldehyde condensation products to obtain intermediate hydrophobic products soluble in dilute aqueous alkali solutions, is that the normal formation of hydrophobic linear and cross-linked macromolecules from methylol ureas by condensation reactions (whereby the hydroxyls in the urea methylol groups are eliminated as water and methylene linkages established) is in some manner altered or modified by the reaction with a selected polyhydric phenol, so that chain growth and/or cross-linkage is temporarily inhibited and sufficient hydroxyl groups in phenolic and urea methylol groups are present to effect solubility in aqueous alkaline solutions. The phenolic methylol groups can be accounted for by the fact that condensation of methylol urea groups releases free formaldehyde which can be expected to react with the polyhydric phenols to form phenol alcohols.

The amount of polyhydric phenol required to obtain reaction products soluble in aqueous alkalis has been found to be between 2% and 20% of the dry weight or solids content of the urea-formaldehyde condensation products as determined by heating a 1 gram sample in a shallow dish (2" diameter) for 2 hours in an oven maintained at a constant temperature of 135° C. Amounts of polyhydric phenol in excess of 20% can be used, but they result in products whose solubility in aqueous alkalis exist for only a few hours after the reaction products have been prepared. A 3-5% quantity of polyhydric phenol has in most instances been found to give optimum solubility in aqueous alkalis together with excellent dispersibility when highly diluted with acidified water and with the most rapid curing speed under normal conditions for drying cellulosic paper.

The reaction with the selected polyhydric phenol can be conducted at room temperatures or at elevated temperatures, that at room temperature generally requiring about 5 to 24 hours for completion, while reactions conducted at elevated temperature can be completed in some instances with the more reactive polyhydric phenols such as phloroglucinol having three meta hydroxyl groups, in as little as five minutes. The reaction can be conducted under acidic, neutral or basic conditions; but reactions conducted under acidic conditions give products of better color. Reactions are preferably conducted under acid conditions at a pH of not less than 2.0 and under alkaline conditions at a pH of not above 12 to avoid the hazard of premature gelation.

The final stage of the reaction between water-soluble condensation products of urea and formaldehyde with a polyhydric phenol of the described class is characterized by a loss of solubility in water in that the reaction mass tolerates decreasing quantities of added neutral water without precipitating; at this first stage of decreased water solubility the reaction mass can be dissolved in an aqueous alkaline solution, but the resulting solution is stable for only a short time, and usually developing cloudiness or precipitation within an hour or less after preparation. Continuing the reaction beyond this initial stage produces viscous resinous masses that are soluble in dilute aqueous alkaline solutions, and such solutions have been found to be stable for several days and therefore afford ample time after their preparation for use in the sizing of paper; at this second stage the resin, while insoluble in neutral water, can nevertheless be dispersed therein to form a stable milky dispersion which, when admixed with an acidified aqueous paper pulp suspension, gradually deposits substantially all the resin particles upon the paper fibers within one to two hours. When the same second-stage resin is first dissolved in an aqueous alkaline solution and this solution then admixed with an aqueous paper pulp suspension, either already of an acid pH or made acid after the addition of the aqueous alkaline resin solution, the precipitation of the resin on the paper fibers occurs at once and is practically complete within a few minutes after it has been added.

A preferred end point in the reaction, yielding viscous resins which deposit most rapidly on cellulosic paper fiber when added in aqueous alkaline solution to acidified pulp, is that determined by dissolving 7 parts of the undehydrated reaction product in 100 parts of one percent aqueous solution of sodium hydroxide, then adding to the alkaline resin solution three parts of a 10% aqueous solution of aluminum sulphate and observing the type of precipitate formed and the time elapsing for precipitation to occur. At the beginning of the reaction a milky dispersion is formed by the reaction mass of polyhydric phenol and water-soluble urea-formaldehyde condensation when tested in this manner requiring several minutes to almost an hour for formation of the dispersion; but, as the reaction is prolonged, products are obtained that precipitate as voluminous flocculent masses shortly after admixture with the aqueous aluminum sulphate; and with still further reaction, resins are obtained which in aqueous alkaline solution precipitate immediately as curdy thread-like bodies when the concentrated aqueous aluminum sulphate solution is added. It is at this last reaction stage that the resins exhibit optimum substantive effects for cellulosic paper fibers and impart maximum wet strength to the paper for the total amount of resin incorporated in the paper sheets as sizing.

It is to be noted that under the test conditions the precipitation occurs in the presence of relatively concentrated amounts of resin and acidic substance, and the curdy precipitates of optimum end point formed under these conditions are normally of no value for paper sizing because they cannot be practically dispersed. But when the same alkaline resin solutions are added to the highly dilute acidic aqueous solutions in the beater or the stock chest of paper machines, the conditions are such that curdy precipitates are not formed and instead the resin is distributed throughout the stock as a dispersion largely in colloidal particle form.

With further reaction beyond the optimum stage, the resin ultimately gels into a rubbery non-dispersible mass. Between the optimum end point and that of gelation, the resins obtained at intermediate stages when tested show the same quick precipitation of curdy thread-like masses, but such resins impart less wet-strength to cellulose paper and have a shorter storage life wherein they retain fusibility and solubility in aqueous alkaline solutions.

To prolong to a maximum the period during which the reaction products remain fusible and can be dissolved in aqueous alkalis, the final pH of the reaction mixture should be adjusted to a pH between 4.0 and 9.0 and preferably between 5.5 and 6.5 whereby the reaction products remain liquid at room temperatures and useful for 4 to 5 days before gelling to a non-dispersible mass. At a pH of 4.4, a urea formaldehyde resin (1 to 3 mols) reacted with 5% resorcinol did not gel at room temperatures until 24 hours after its preparation, whereas the same resin modified with 10% resorcinol at the same pH gelled in 10 hours, and when modified with 20% resorcinol and at a pH of 4.5 it gelled in 8 hours. Under alkaline conditions the same urea formaldehyde resin modified with 5% resorcinol and adjusted to a pH of 8.2 gelled in 24 hours but when adjusted to a pH of 8.6 gelled in 8 to 10 hours.

For preparing the aqueous alkaline solutions, in which the modified urea formaldehyde resins are to be dissolved, any water-soluble organic or inorganic alkali can be used. Of the inorganic alkalies sodium hydroxide, potassium hydroxide, their carbonates and ammonium hydroxide are most useful because of their reasonable cost. The useful organic water-soluble alkaline materials include the mono alkyl amines such as ethylamine, butylamine, alkylene polyamines, as ethylene diamine, propylene diamine and diethylene triamine, and alcohol amines as triethanolamine and diethanolamine and cyclic amines such as morpholine and n, ethyl morpholine. Tertiary amines are preferred to other organic alkaline materials because they contain no reactive hydrogen attached to nitrogen and therefore do not react with any free formaldehyde or polyhydric phenols to give undesirable side reactive products. High concentrations of the alkaline materials are ordinarily not required for dissolving the polyhydric phenol modified urea formaldehyde resins except with the more highly condensed reaction products. In most instances a 2 to 5% solution of the alkaline material is sufficient and with the stronger alkalies such as sodium hydroxide a solution as dilute as 1 part alkali to 300 parts water is adequate.

For the polyhydric phenol modified urea-formaldehyde resins prepared with alkaline catalysts and/or which upon completion of the initial reaction are substantially neutral or of an alkaline pH, it is not essential in every instance that additional water-soluble alkali be present in the diluting water, since these resins in themselves are sufficiently alkaline to maintain an alkaline pH when moderately diluted with neutral water. If, however, upon extreme dilution a cloud or milky dispersion results, the mixture can be cleared if desired by the addition of water-soluble alkali in small quantities.

The invention is further illustrated by the following examples which are not to be considered as limitations thereof but as indicating the modifications which have been made and others which can readily be recognized by those skilled in the art.

EXAMPLE 1a

One mol urea (60 parts) was reacted at the boiling point with three mols (240 parts) 37% aqueous commercial formaldehyde in the presence of two parts of hexamethylene tetramine as catalyst until a syrupy resin of 40% solids content, a viscosity of 20 centipoises, and a pH of 8 was obtained. The resin was soluble in neutral water one part thereof being miscible with over one hundred parts water.

One hundred parts southern coniferous kraft fiber in suspension in 6000 parts water were admixed with an aqueous solution containing two parts (solids) of the above urea resin and fifty parts water. The pH of the mixture was reduced with aluminum sulfate to pH 4.1 and then allowed to stand for 2 hours since it was ascertained that this time was necessary for substantially complete precipitation of the resin upon the fibers to yield paper of maximum wet strength. Hand laid paper of 45 lbs. per ream basis weight (as determined by Tappi procedure T410-M-45) was then made by diluting the fiber suspension to a paper making consistency, the diluted mixture being also adjusted to pH 4.1, and the sheets being formed in conformance to Tappi procedure T205-M-45. The paper sheet was dried and heated 1 minute at 260° F. resulting in a sheet having a wet tensile strength of 4.3 lbs. per inch of width, (as determined by Tappi procedure T456-M-44) which increased on subsequent baking for 3 minutes at 360° F. to 5.7 lbs. per inch of width.

Paper of the same weight made from the same fiber stock, without the urea formaldehyde resin, and tested in the same manner, had a wet tensile strength of only 0.4 lb. per inch of width.

EXAMPLE 1b

One hundred parts solids of the water-soluble urea formaldehyde resin prepared as in Example 1a were heated for 10 minutes to 90° C. with 4 parts resorcinol (dissolved in 4 parts ethyl alcohol to facilitate solution). The pH of the mixture before heating was adjusted to 8 with triethanolamine and after heating it had decreased to 6.95. A clear resin of slightly increased viscosity and 42% solids content was produced by this reaction. Five parts of the undehydrated resin tolerated up to 95 parts neutral water to yield a clear solution. Two parts (solids) of the modified resin were dissolved in fifty parts neutral water, and then added to an identical suspension of the southern kraft fiber and paper made under the same conditions of consistency, pH, basis weight, drying and subsequent heating as in Example 1a. The wet tensile strength of the paper so made was 5.9 lbs. per inch of width after 1 minute drying and heating at 260° F. which increased to 7.3 lbs. per inch of width when further heated for 3 minutes at 360° F., an improvement of approximately 30 percent over the data of Example 1a.

EXAMPLE 2a

One hundred parts (solids) of the same urea formaldehyde resin as in Example 1a were mixed with 2.0 parts resorcinol and the pH adjusted to 5.5 by the addition of lactic acid. The mixture was allowed to stand at room temperature (70-75° F.) for 24 hours, and yielded a clear syrupy resin which was immiscible with more than an equal amount of neutral water, but was completely soluble in very dilute caustic soda (1 part sodium hydroxide and 300 parts water). One hundred parts of the modified resin were dissolved in 600 parts of the dilute caustic soda and enough of the solution to contain 2 parts resin solids was added to 100 parts of the same southern kraft fiber suspended in water as before. The pH of the stock was then reduced with aluminum sulphate to 4.1; paper was made, dried and heated under the conditions described in Examples 1a and 1b. Maximum wet strength was obtained after the stock had 15 minutes of contact between fiber, resin and aluminum sulphate before forming the sheet. After 1 minute of heating and drying the paper sheet at 260° F. the paper had a wet tensile strength of 6.0 lbs. per inch of width. This value increased to 8.7 lbs. per inch of width with an additional bake for 3 minutes at 360° F., or an average improvement of 45 per cent over that obtained with the urea formaldehyde resin not reacted with resorcinol.

EXAMPLE 2b

One part resin solids in the form of the same alkaline aqueous solution as in Example 2a added to 100 parts of the southern kraft fiber in the same manner produced a wet tensile strength in the resultant paper of 6.1 lbs. per inch of width after drying and heating for 1 minute at 260° F. and 6.6 lbs. per inch of width after an additional 3 minutes' heating at 360° F. These values are on the average 20 percent higher than those obtained with the urea formaldehyde resin not reacted with resorcinol.

EXAMPLE 2c

When two parts of resin solids in the alkaline aqueous solution as prepared in Example 2a were added to 100 parts of the same kraft fiber and the pH adjusted to pH 5.4 with aluminum sulphate before forming a sheet, the wet tensile strength thereof rose to 5.6 lbs. per inch of width after drying and heating the paper sheet for 1 minute at 260° F. and to 7.1 lbs. per inch of width with an additional three minutes' heating at 360° F., an average improvement of 30 percent over the values reported in Example 1a for paper containing two percent urea formaldehyde resin solids not prior reacted with resorcinol and which was heat converted at the more acid pH 4.1.

EXAMPLE 3

One hundred parts (solids) of the resin described in Example 1a, were mixed with four parts phloroglucinol ($C_6H_3(OH)_3.2H_2O$) dissolved in four parts ethyl alcohol. The pH of the mixture was adjusted to 4.7 by the addition of lactic acid. After two minutes' reacting at room temperature the resin was insoluble in more than an equal quantity of neutral water but yielded a clear solution when five parts of the undehydrated resin were dissolved in 100 parts of a 1% aqueous solution of sodium hydroxide. Such a solution in amount containing two parts resin solids was added to 100 parts of the kraft fiber described in Example 1a previously adjusted to pH 4.5 by the addition of aluminum sulphate and hydrochloric acid. After standing for fifteen minutes paper of 45 lbs. basis weight was made from the stock. The sheets were dried and baked for one minute at 260° F., producing paper having a wet tensile strength of 7.5 lbs. per inch of width (dry tensile 18 lbs. per inch of width according to Tappi procedure T404-M-45), which is 75 percent higher than that obtained with the unmodified urea formaldehyde resin of Example 1a.

EXAMPLE 4

Four parfts pyrogallol were mixed with 100 parts (solids) of the resin described in Example 1a, the mixture being allowed to react at room temperature for 24 hours, the pH of the mixture having been initially adjusted to 4.3 by the addition of lactic acid. The viscous resin was now insoluble in less than equal quantity of neutral or acidified water; it was infinitely soluble however in dilute alkaline aqueous solutions; specifically, six parts of undehydrated resin added to one hundred parts of a one percent aqueous solution of sodium hydroxide produced a clear solution. Enough of such a solution to contain two parts (solids) of resin were added to 100 parts southern kraft fiber suspended in 6000 parts water. The pH of this stock was adjusted to 4.5 by the addition of aluminum sulphate. The stock was permitted to stand for fifteen minutes to complete the precipitation of resin on the paper fibers and paper in sheet form was then made. The wet sheets were dried for three minutes at 360° F. and resulted in paper having a dry strength of 18 lbs. per inch of width and a wet strength of 6 lbs. per inch of width, which averaged over 50% higher than those obtained with the unmodified urea formaldehyde resin described in Example 1a.

EXAMPLE 5

100 parts (solids) of the resin described in Example 1a were allowed to react for 13 hours at room temperature (70–75° F.) with three parts methyl phloroglucinol, a sufficient amount of sodium hydroxide having been added thereto to maintain a pH of 11. The resultant syrupy resin when adjusted to a pH of less than 7.0 was only sparingly soluble in neutral or acidified water yielding a precipitate when more than an equal quantity neutral water was added thereto. However, at a pH of 11 the reacted resin was completely miscible with neutral water. A clear solution so prepared was added to an aqueous suspension of southern kraft fibers in such amount as to contain two parts resin solids per 100 parts fiber. The mixture was reduced to paper making consistency and the pH adjusted to 4.5 by the addition of aluminum sulphate and hydrochloric acid. The stock after standing for fifteen minutes was fed onto a wire screen to form sheets which after drying for one minute at 260° C. had a wet tensile strength of 6.2 lbs. per inch of width, increasing to 7.9 lbs. with an additional baking for three minutes at 360° F.

EXAMPLE 6

One hundred parts (solids) of the resin described under Example 1a were mixed with two parts triethanolamine and four parts napthoresorcinol previously dissolved in an equal weight of ethyl alcohol. The resultant mixture having a pH of 8.4 was heated 25 minutes at 95° C. yielding a syrupy resin soluble in neutral water but insoluble therein when the pH of the resin was reduced to below 7.0 before admixing it with the water. One part resin solids in aqueous alkaline solution was added to 100 parts kraft fiber suspended in 6000 parts water. The stock was acidified with aluminum sulphate to pH 6 and then with hydrochloric acid to pH 4.5. After standing for fifteen minutes, paper of 45 lbs. basis weight was made from the stock and dried one minute at 220° F. and then aged three weeks at room temperature to further cure the resin. The wet strength was thereby raised to 5.1 lbs. per inch of width.

An equivalent amount of the unmodified urea-formaldehyde resin when similarly applied to the same paper fibers, dried, and then aged at room temperature exhibited a wet strength of only 2.6 lbs. per inch.

EXAMPLE 7a

A suspension of paper-making fibers consisting of 60 percent bleached spruce sulfite pulp and 40 percent groundwood pulp was made and diluted with water to 0.5 percent consistency. Aluminum sulphate was added to lower the pH of the stock to 6.0 and then this was further adjusted to pH 4.5 with hydrochloric acid. To an amount of this suspension equivalent to 100 parts dry fiber there was added 0.5 part (solids content) of the urea formaldehyde resin described in Example 1a, diluted with water (1:10). Paper of 45 lbs. basis weight was made after the stock had stood for two hours; the paper was dried to 2 percent moisture content on cans at 220° F., 66 seconds being required for this operation. The average wet tensile strength of the paper thus made (dry tensile 13 lbs. per inch) was 1.6 lbs. per inch width.

EXAMPLE 7b

In a second experiment 100 parts of the urea formaldehyde resin of Example 1a were first mixed with 2 parts resorcinol and 2 parts alcohol and the pH adjusted to 4.5 with lactic acid. This mixture was allowed to react 24 hours at 70-75° F. One part of the resultant viscous resin tolerated less than equal quantity of neutral water but dissolved completely in a one percent aqueous solution of sodium hydroxide. To 100 parts of the same fiber suspension as in Example 7a there was added a sufficient amount of the modified resin in the aqueous sodium hydroxide solution to provide 0.5 lb. resin solids per 100 lbs. dry fiber. Paper was made after the fibers had been in contact with the modified resin for a three-minute interval, at the same pH (4.5), the adjustment being made as above (Example 7a) and the paper dried in the same way. The wet tensile strength was increased to 2.2 lbs. per inch width which increased on storage for six weeks at room temperature to 2.7 lbs. per inch. The wet strength of the paper made with the unmodified urea formaldehyde resin without the prior reaction with resorcinol did not increase during this period of storage.

EXAMPLE 8a

A resin was made by reacting at 100° C. one mol urea with 1.6 mols 37% aqueous formaldehyde in the presence of sufficient ammonium hydroxide to give a pH of 8.5 initially. The reaction was terminated when the viscosity of the resin produced increased to 70 centipoises at 47% solids content, attended by a specific gravity of 1.195 and solubility in neutral water.

To 100 parts kraft fiber in aqueous suspension (2% consistency) acidified to a pH 4.6 with aluminum sulphate were added 2 parts (solids content) of this resin, previously diluted with water (1 part resin to 10 parts water). The pH of the stock was again adjusted to 4.6 with aluminum sulphate and paper made after the stock had aged one and three hours respectively. The sheets were dried and baked 1 minute at 260° F. The wet tensile strength of the paper made after standing for one hour (45 lbs. basis weight) was 1.8 lbs. per inch width and that of the paper made after the stock stood for three hours was 2.6 lbs. per inch width. The latter value increased to 5.2 lbs. per inch after heating the paper for an additional three minutes at 360° F. Paper made from the same paper fibers but without resin sizing had a wet strength of only 0.4 lb. per inch width.

EXAMPLE 8b

In a second trial 100 parts (solids) of the same urea formaldehyde resin prepared as in Example 8a were first allowed to react 30 minutes at 75° F. with 4.3 parts resorcinol the mixture being first adjusted to a pH of 3.2 with lactic acid. Two parts (solids) of the reacted resin were then dissolved in 100 parts of a 1% aqueous sodium hydroxide solution and the solution added to 100 parts kraft fiber suspended in acidified water as in Example 8a. The pH was again adjusted to 4.6 as before and paper made after the stock had aged 10 minutes after the addition of the resin. Paper made therefrom which was dried and heated for a minute at 260° F. had a wet tensile strength of 3.2 lbs. per inch width which increased to 6.2 lbs. per inch width on further heating for three minutes at 360° F.

EXAMPLE 9

100 parts (solids) of the urea formaldehyde resin described in Example 1a was mixed with 12 parts triethanolamine and with a solution of 3 parts tetrachlororesorcinol in an equal weight of ethyl alcohol; the pH of the mixture was 7.9. After 24 hours' reaction at 75-78° F. the resin when diluted to 3 percent solids content with neutral water formed an immediate thread-like curdy precipitate on addition to a relatively concentrated (10%) aqueous solution of aluminum sulphate. The resin was dissolved in a one percent aqueous sodium hydroxide solution to form a solution containing six percent resin solids. This solution in quantity to yield a one percent resin solids content on the dry fiber weight was added to a pulp suspension such as described in Example 8a. The stock was previously acidified as described in Example 7a and paper made after a three minute contact period. The wet paper was dried and heated for one minute at 225° F. The wet tensile strength of paper so made was 3.4 lbs. per inch width.

A mixture of triethanolamine, tetrachlororesorcinol and water when allowed to stand produced increasingly heavy precipitates with silver nitrate, showing gradual separation of chloride ion.

EXAMPLE 10a

Wet strength paper was prepared on commercial size paper making equipment comprising a five mould cylinder machine, 108" width, with a productive capacity of about 4300 lbs. per hour. The paper furnish had the following composition:

| | |
|---|---|
| Pulp (50% semi-bleached kraft; 50% sulphite plus 15% waste or "broke") lbs | 3500 |
| Potato starch lbs | 105 |
| Rosin size lbs | 50 |
| Aluminum sulphate lbs | 200 |
| Sodium silicate lbs | 87 |
| Consistency in beater percent | 4 |

Paper of 13 mils thickness, supercalendered for gloss was made from this furnish at the rate of 134 feet per minute the temperature of the steam driers being 230°-240° F.

EXAMPLE 10b

The undehydrated urea formaldehyde resin of Example 1a was reacted with a 2% quantity of resorcinol for 18 hours at pH 5.5, as attained by the addition of a sufficient amount of lactic acid. The undehydrated reacted resin was diluted with aqueous sodium hydroxide to form a solution containing per gallon 1.0 lb. undehydrated resin and 0.01 lb. sodium hydroxide. This solution was poured into the beater containing the paper furnish described in Example 10a, enough solution being added to yield three parts of undehydrated resin per 100 parts of paper fibers. The paper furnish at pH of 4.3 before the addition of the resin solution was again adjusted to that pH with aluminum sulphate. Two hours after the resin had been added, the paper pulp reached the machine, and paper was made under the conditions described in Example 10a.

EXAMPLE 10c

The resorcinol modified urea formaldehyde resin described in Example 10b was diluted in the same manner and added in the same quantity to the paper furnish of Example 10a. The resin solution however was mixed with the paper fibers by being pumped at a constant rate into the riffle box where high consistency paper pulp is diluted with white water to machine consistency (approximately 0.2%). From there the mixture took only a few minutes to pass through the consistency regulator and reach the machine. There the furnish was consumed within one hour's running time, the paper being made and dried under the same conditions described in Example 10a.

Tests conducted on the papers made in accordance with Examples 10a, 10b, and 10c are tabulated below:

Table

|  | Example 10a | Example 10b | | Example 10c | |
|---|---|---|---|---|---|
| Sample No | I | II | III | IV | V |
| Basis Weight per sq. in | 299 | 307 | 305 | 294 | 301 |
| Basis Weight, lbs./ream, Tappi [1] | 213 | 216 | 217 | 209 | 214 |
| Thickness, mils | 12.9 | 13.5 | 13.4 | 13.1 | 13.4 |
| Tensile, dry, lbs./in., MD [2] | 161 | 167 | 168 | 158 | 156 |
| Tensile, dry, lbs./in., CD [3] | 42 | 43 | 39 | 40 | 42 |
| Tensile, wet, lbs./in., MD | 22 | 44 | 44 | 47 | 47 |
| Tensile, wet, lbs./in., CD | 6.0 | 12.4 | 11.9 | 13.9 | 13.6 |
| Wet tensile strength retention, MD, percent | 13.5 | 26.6 | 26.5 | 29.6 | 30.0 |
| Wet tensile strength retention, CD, percent | 14.1 | 28.8 | 30.3 | 34.5 | 32.2 |
| Wet tensile retention, average percent | 13.8 | 27.7 | 28.4 | 32.0 | 31.1 |
| Mullen bursting, dry, lbs./sq. in | 145 | 172 | 150 | 147 | 147 |
| Mullen, wet, lbs./sq. in | 10 | 50 | 30 | 47 | 47 |
| Mullen retention, percent | 7 | 29 | 20 | 32 | 32 |
| Tear (Elmendorf), Dry, MD | 283 | 240 | 261 | 277 | 304 |
| Tear (Elmendorf), Wet | 300 | 320 | 405 | 368 | 449 |
| Tear retention, MD, percent | 106 | 133 | 155 | 133 | 148 |

[1] 500 sheets, 25″ x 40″.
[2] MD = machine direction.
[3] CD = cross direction.
All wet tests 24 hour soak.
Sample I was taken 30 minutes after start of run; sample II, 10 minutes after start of run; sample III, 60 minutes after start of run; sample IV, 20 minutes after start of run; and sample V, 35 minutes after start of run.

Other acidic catalysts than the economical hydrochloric acid and aluminum sulphate mentioned in the examples can of course be used for accelerating the heat conversion of the polyhydric phenol modified urea-formaldehyde resin. In general they include all which have been found useful for catalysing unmodified urea formaldehyde resins and which when used in dilute aqueous solution give a pH preferably between 4 to 6. Specifically they include acidic salts such as ammonium salts of strong organic and inorganic acids as ammonium oxalate, ammonium chloride, mono, di or tri ammonium phosphates; the stronger water-soluble acids such as sulphuric acid, sulphamic acid, oxalic acid, acetic acid, formic acid, lactic acid, citric acid, tartaric acid; and the organic sulphonic acids as benzene sulphonic acid, toluene sulphonic acid, and o- or p-phenol sulphonic acids.

Wet-strength paper made in accordance with the invention is particularly useful for toweling since the water-absorptive properties of the paper fibers are substantially retained albeit the wet strength of the paper has been considerably increased from the treatment with the modified urea-formaldehyde resin. Other paper products dependent upon good wet-strength unattended by brittleness for proper functioning in use include food wrappers, tea bags, paper in thread, cord or twine form, wall paper, building paper, paper shipping bags; all such specific papers are readily sized with the modified resin during their manufacture. As was stated hereinbefore with respect to unmodified urea-formaldehyde resin, the modified resins are also used as a size in such quantity that the finished paper contains at most five percent of solid resin. Above this amount of resin there is no appreciable increase in wet-strength and the finished paper is embrittled out of all proportion to the net gain in wet-strength achieved.

Other conventional sizing materials such as starch, rosin (as aluminum resinate) casein and glue may be used in conjunction with the modified urea-formaldehyde resins, as well as loading materials, china clay, calcium sulphate and other pigment matter in the preparation of various papers.

What is claimed is:

1. Cellulosic paper characterized by retention and improvement of its wet-strength upon aging, said paper being sized with from 0.5 to 5.0% by weight of a heat-converted reaction product of a water-soluble, heat-convertible condensation product of one mol urea and between one and four mols formaldehyde modified by reaction of between 2 and 20% by weight on the solids content of the condensation product with a polyhydric phenol having at least two hydroxyl groups in a meta position to each other, each meta hydroxyl group having an individual hydrogen atom ortho thereto, said modified condensation product prior to heat-conversion being soluble in aqueous alkaline solution, but at most only partly soluble in neutral water, and having a positive charge when colloidally dispersed in an acidified aqueous solution.

2. Cellulosic paper characterized by retention and improvement of its wet-strength upon aging, said paper being sized with from 0.5 to 5.0% by weight of a heat-converted reaction product of a water-soluble, heat-convertible condensate of one mol urea and between one and four mols formaldehyde modified by reaction with resorcinol in an amount between 2 and 20% by weight on the solids content of the condensate, said reaction product prior to heat-conversion being soluble in aqueous alkaline solution, but at most only partly soluble in neutral water, and having a positive charge when colloidally dispersed in an acidified aqueous solution.

3. Cellulosic paper characterized by retention and improvement of its wet-strength upon aging, said paper being sized with from 0.5 to 5.0% by weight of a heat-converted reaction product of a water-soluble, heat-convertible condensate of one mol urea and between one and four mols formaldehyde modified by reaction with phloroglucinol in an amount between 2 and 20% by weight on the solids content of said condensate, said modified product prior to being heat-converted being soluble in aqueous alkaline solutions, but at most only partly soluble in neutral water, and having a positive charge when colloidally dispersed in acidified water.

4. Cellulosic paper characterized by retention and improvement of its wet-strength upon aging, said paper being sized with from 0.5 to 5.0% by weight of a heat-converted reaction product of a water-soluble, heat-convertible condensate of one mol urea and between one and four mols formaldehyde modified by reaction with pyrogallol in an amount between 2 and 20% by weight on the solids content of said condensate, said modified product prior to being heat-converted being soluble in aqueous alkaline solutions, but at most only partly soluble in neutral water, and having a positive charge when colloidally dispersed in acidified water.

5. Method of sizing cellulosic paper to increase its wet-strength which comprises mixing an aqueous suspension of cellulosic paper fibers having a negative electric charge with a dilute aqueous alkaline solution of a resin which is the reaction product of: (1) a water-soluble heat-convertible condensate of one mol urea and between one and four mols formaldehyde and, (2) a polyhydric phenol having at least two hydroxyl groups in a meta position to each other, each hydroxyl group having an individual hydrogen atom ortho thereto on the phenolic ring in amount between 2 and 20% by weight of said condensate and said resin being only partly soluble in water, but soluble in aqueous alkaline solutions, acidifying the aqueous mixture of paper fibers and said resin to form a colloidal dispersion of the resin wherein the colloidal resin particles exhibit a positive electric charge causing rapid precipitation of the resin particles on to the negatively charged paper fibers, forming a sheet from the paper fibers after the resin particles have precipitated thereon and then drying the sheet at an elevated temperature.

HERBERT WILLIAM MACKINNEY.
SIDNEY JOSEPH SCHULTZ.

References Cited in the file of this patent

UNITED STATES PATENTS

| Number | Name | Date |
|---|---|---|
| 1,912,593 | Pollak | June 6, 1933 |
| 2,190,239 | Menger | Feb. 13, 1940 |
| 2,325,302 | Britt | July 27, 1943 |
| 2,338,602 | Schur | Jan. 4, 1944 |
| 2,376,687 | Goldstein et al. | May 22, 1944 |
| 2,376,688 | Goldstein et al. | May 22, 1944 |
| 2,400,544 | Kline et al. | May 21, 1946 |
| 2,407,376 | Maxwell | Sept. 10, 1946 |
| 2,414,320 | Miller et al. | Jan. 14, 1947 |
| 2,500,054 | Anthony et al. | Mar. 7, 1950 |

FOREIGN PATENTS

| Number | Country | Date |
|---|---|---|
| 502,720 | Great Britain | Mar. 23, 1939 |

OTHER REFERENCES

Paper Trade Journal, April 11, 1940, pp. 206–207.

Kunststoffe, Bd. 29, Heft 11, p. 307 (1939).